United States Patent
Athavale et al.

(10) Patent No.: US 11,121,654 B2
(45) Date of Patent: Sep. 14, 2021

(54) DYNAMIC STABILITY CONTROL FOR ELECTRIC MOTOR DRIVES USING STATOR FLUX ORIENTED CONTROL

(71) Applicant: SF Motors, Inc., Santa Clara, CA (US)

(72) Inventors: Apoorva Athavale, Santa Clara, CA (US); Ruonan Zhou, Santa Clara, CA (US); Chen-Yen Yu, Santa Clara, CA (US); Yifan Tang, Santa Clara, CA (US)

(73) Assignee: SF MOTORS, INC., Santa Clara, CA (US)

( * ) Notice: Subject to any disclaimer, the term of this patent is extended or adjusted under 35 U.S.C. 154(b) by 0 days.

(21) Appl. No.: 16/588,526

(22) Filed: Sep. 30, 2019

(65) Prior Publication Data

US 2021/0099118 A1  Apr. 1, 2021

(51) Int. Cl.
*H02P 23/00* (2016.01)
*H02P 21/09* (2016.01)
*B60L 15/20* (2006.01)
*B60W 30/02* (2012.01)

(52) U.S. Cl.
CPC .............. *H02P 21/09* (2016.02); *B60L 15/20* (2013.01); *B60W 30/02* (2013.01)

(58) Field of Classification Search
CPC .......... H02P 23/08; H02P 23/14; G05B 19/00
See application file for complete search history.

(56) References Cited

U.S. PATENT DOCUMENTS 5,994,867 A * 11/1999 Birk ................. H02P 21/24
                                                    318/609
9,174,645 B2 * 11/2015 Beechie .......... B60W 30/18027

FOREIGN PATENT DOCUMENTS

JP         05300606 A  * 11/1993  ............... B60L 3/10

OTHER PUBLICATIONS

X. Xu, R. De Doncker and D. W. Novotny, "A stator flux oriented induction machine drive," PESC '88 Record., 19th Annual IEEE Power Electronics Specialists Conference, Kyoto, Japan, 1988, pp. 870-876 vol. 2.

* cited by examiner

*Primary Examiner* — Karen Masih
(74) *Attorney, Agent, or Firm* — Foley & Lardner LLP; James De Vellis

(57) ABSTRACT

Dynamic stability control for electric motors is provided. The system determines, for an electric motor of the electric vehicle, a slip frequency indicating a difference between a synchronous speed of a magnetic field of the electric motor and a rotating speed of a rotor of the electric motor. The system compares the slip frequency with a threshold. The system activates, responsive to the slip frequency greater than or equal to the threshold, a slip limiter to adjust a current command to generate an adjusted current command that causes a reduction in the slip frequency. The system deactivates, responsive to an external torque command less than a subsequent current command received subsequent to transmission of the adjusted current command, the slip limiter.

17 Claims, 7 Drawing Sheets

DYNAMIC STABILITY CONTROL FOR ELECTRIC MOTOR DRIVES USING STATOR FLUX ORIENTED CONTROL

BACKGROUND

Vehicles such as automobiles can include can include an electric motor. The electric motor can provide torque to cause the vehicle to accelerate.

SUMMARY

This technology is directed to systems and methods of maintaining torque in an electric vehicle. The technical solution can provide dynamic stability control for electric motor drives using stator flux-oriented control. The technical solution can provide dynamic stability control and improve peak torque performance for electric vehicles that use induction electric motors or permanent magnet electric motors. For example, a vehicle stability control system can determine, for induction electric motors, determine a slip frequency based on a stator voltage command vector, stator current vector, and a measured mechanical angle position. For permanent magnet electric motors, the vehicle stability control system can determine a stator flux angle in a rotor reference frame. The vehicle stability control system can determine to adjust a q-axis current level being provided to the electric motor based on the slip frequency or the stator flux angle so as to reduce instability. By using the slip frequency or stator flux angle to adjust the q-axis current, the system can improve peak torque performance of the electric motor by not unnecessarily reducing the q-axis current, while also preventing, reducing or mitigating instability.

At least one aspect is directed to a system to maintain torque in an electric vehicle. The system can include a vehicle stability control system comprising one or more processors. The vehicle stability control system can determine, for an electric motor of the electric vehicle, a slip frequency indicating a difference between a synchronous speed of a magnetic field of the electric motor and a rotating speed of a rotor of the electric motor. The vehicle stability control system can compare the slip frequency with a threshold. The vehicle stability control system can activate, responsive to the slip frequency greater than or equal to the threshold, a slip limiter to adjust a current command to generate an adjusted current command that causes a reduction in the slip frequency. The vehicle stability control system can deactivate, responsive to an external torque command less than a subsequent current command received subsequent to transmission of the adjusted current command, the slip limiter.

At least one aspect is directed to a method of maintaining torque in an electric vehicle. The method can include a vehicle stability control system determining, for an electric motor of the electric vehicle, a slip frequency indicating a difference between a synchronous speed of a magnetic field of the electric motor and a rotating speed of a rotor of the electric motor. The method can include the vehicle stability control system comparing the slip frequency with a threshold. The method can include the vehicle stability control system activating, responsive to the slip frequency greater than or equal to the threshold, a slip limiter to adjust a current command to generate an adjusted current command that causes a reduction in the slip frequency. The method can include the vehicle stability control system deactivating, responsive to an external torque command less than a subsequent current command received subsequent to transmission of the adjusted current command, the slip limiter.

At least one aspect is directed to a system to maintain torque in an electric vehicle. The system can include a vehicle stability control system comprising one or more processors. The vehicle stability control system can determine, for an electric motor of the electric vehicle, a stator flux angle in a rotor reference frame of the electric motor. The vehicle stability control system can compare the stator flux angle with a threshold. The vehicle stability control system can activate, responsive to the stator flux angle greater than or equal to the threshold, a stator flux angle limiter to adjust a current command to cause a reduction in the stator flux angle. The vehicle stability control system can deactivate, responsive to an external torque command less than the current command adjusted by the stator flux angle limiter, the stator flux angle limiter.

At least one aspect is directed to a method of maintaining torque in an electric vehicle. The method can include a vehicle stability control system determining, for an electric motor of the electric vehicle, a stator flux angle in a rotor reference frame of the electric motor. The method can include a vehicle stability control system comparing the stator flux angle with a threshold. The method can include a vehicle stability control system activating, responsive to the stator flux angle greater than or equal to the threshold, a stator flux angle limiter to adjust a current command to cause a reduction in the stator flux angle. The method can include a vehicle stability control system deactivating, responsive to an external torque command less than the current command adjusted by the stator flux angle limiter, the stator flux angle limiter.

At least one aspect is directed to an electric vehicle. The electric vehicle can include a vehicle stability control system comprising one or more processors. The vehicle stability control system can determine, for an electric motor of the electric vehicle, a slip frequency indicating a difference between a synchronous speed of a magnetic field of the electric motor and a rotating speed of a rotor of the electric motor. The vehicle stability control system can compare the slip frequency with a threshold. The vehicle stability control system can activate, responsive to the slip frequency greater than or equal to the threshold, a slip limiter to adjust a current command to generate an adjusted current command that causes a reduction in the slip frequency. The vehicle stability control system can deactivate, responsive to an external torque command less than a subsequent current command received subsequent to transmission of the adjusted current command, the slip limiter.

At least one aspect is directed to an electric vehicle. The electric vehicle can include a vehicle stability control system comprising one or more processors. The vehicle stability control system can determine, for an electric motor of the electric vehicle, a stator flux angle in a rotor reference frame of the electric motor. The vehicle stability control system can compare the stator flux angle with a threshold. The vehicle stability control system can activate, responsive to the stator flux angle greater than or equal to the threshold, a stator flux angle limiter to adjust a current command to cause a reduction in the stator flux angle. The vehicle stability control system can deactivate, responsive to an external torque command less than the current command adjusted by the stator flux angle limiter, the stator flux angle limiter.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
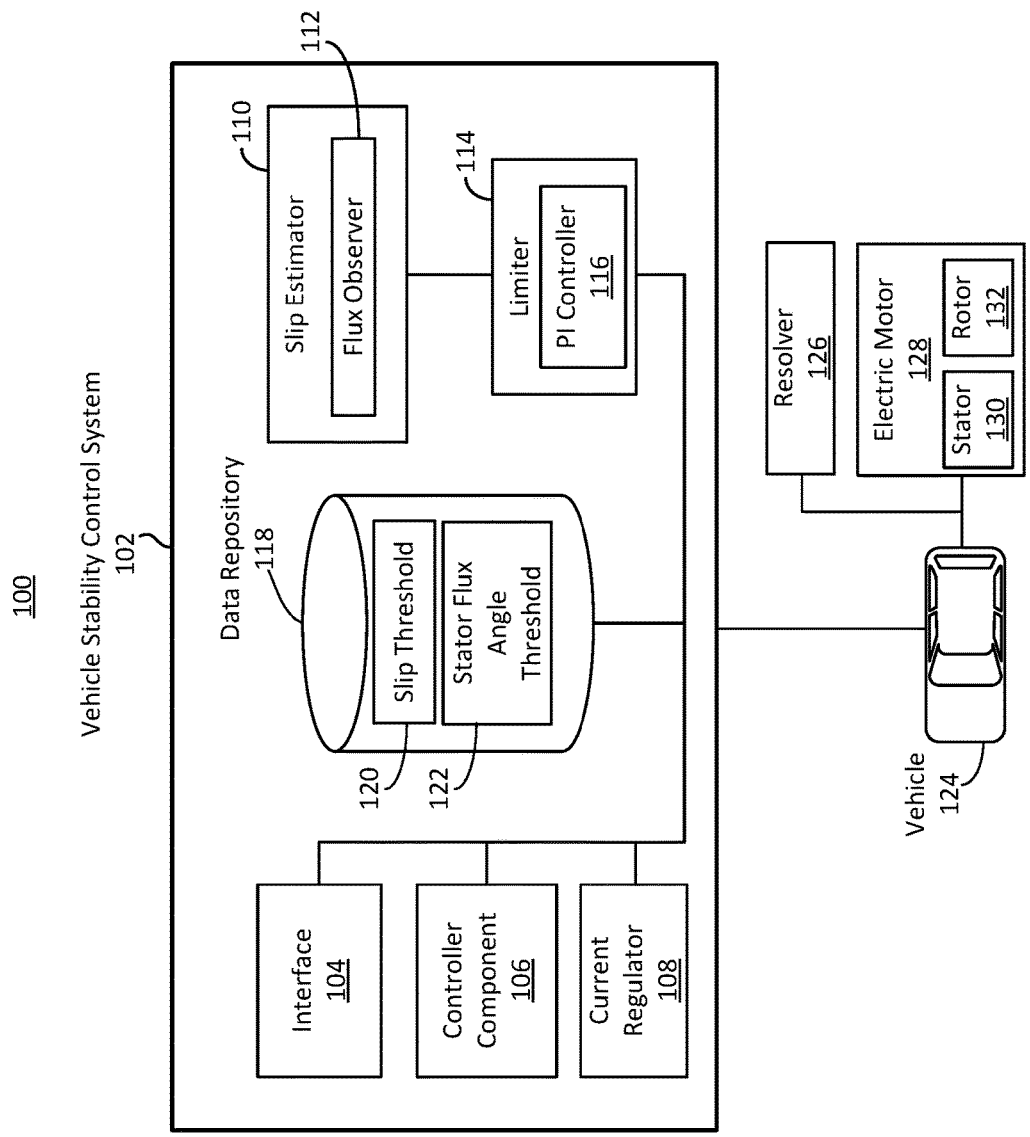
FIG. 1 depicts a block diagram depicting an example system to maintain torque in an electric vehicle, in accordance with an implementation.

Following below are more detailed descriptions of various concepts related to, and implementations of, methods, apparatuses, and systems of maintaining torque in an electric vehicle. The various concepts introduced above and discussed in greater detail below may be implemented in any of numerous ways.

Systems and methods of this technical solution are directed to maintaining torque in electrical vehicles. A vehicle stability control system of this technical solution can provide dynamic stability control for electric motors (e.g., induction motors or permanent magnet motors) using stator flux oriented control.

It can be challenging to provide peak torque performance while maintaining vehicle stability. For example, vehicle torque controllers can provide rotor flux-oriented control (RFO) control or stator flux-oriented (SFO) control. The RFO and SFO control techniques can attempt to estimate flux of the electric motor. In asynchronous machines such as induction motors, estimating the rotor flux can be based on an accurate estimation of several motor parameters such as the rotor resistance (e.g., which can change over time with temperature and can be difficult to measure), rotor leakage inductance, stator leakage inductance and mutual inductance. However, to determine or estimate the stator flux linkage for the SFO control technique, the system determines or estimates the stator resistance, which can be determined with greater precision or accuracy relative to parameters used for RFO control. Thus, SFO control can be more robust and insensitive to changes in parameters relative to RFO control.

In SFO control, the flux regulator can maintain the flux magnitude to a set command (e.g., which can vary with torque commands and speed), while a current regulator can control the magnitude of the current orthogonal to the flux, to obtain the desired torque. Due to a non-linear relationship between current, flux, and torque, there can be a maximum feasible torque (e.g., pull-out torque) for a given flux. A torque command higher than this maximum feasible torque can result in an instability that causes large oscillations in torque and current in SFO.

To avoid electric motor of vehicle instability, a system can limit the torque command using a calibrated look-up-table of the pull-out torque as a function of flux. The system can determine the flux and then perform a look-up in a table to determine the corresponding pull-out torque. The generation of the look-up table can include determining for a given flux, what is the maximum orthogonal current (e.g., q-axis current) so the electric motor is not unstable. The system can compare the torque command with the pull-out torque, and determine to reduce or adjust a current so as to reduce the torque command, thereby avoiding instability. However, calibrating the look-up table of the pull-out torque as a function of flux can be resource intensive, time consuming, expensive, or require extensive experimentation. Furthermore, it can be challenging to have an electric motor operate or perform at the actual pull-out torque even if the look-up table is accurately calibrated because it can be challenging or difficult to obtain an accurate or precise estimation of the flux. Errors in the flux estimation can lead to loss of control due to the instability, regardless of how well the look-up table is calibrated. To prevent instability, systems may reduce the torque limit (e.g., in the look-up table) to account for flux estimation errors. Thus, even if the resource intensive generation of the look-up table has been accurately performed, which is challenging, SFO based methods may still not be able to fully utilize the torque capability of the machine in order to account for flux estimation errors that can lead to instability.

For example, an electric vehicle driving at highway speeds, where the flux of the electric motor may be relatively low, may realize large oscillation in torque if the system goes unstable, which can cause constant jerk in motion. In another example, if the electric vehicle is traveling at a low speed, and begins to accelerate at a high acceleration, the electric motor can become unstable when the q-axis current continues to increase to a large value, which can trigger protection measures that can disable the electric motor.

This technical solution can provide dynamic stability control for electric motor drives using stator flux-oriented control. The technical solution can provide dynamic stability control and improve peak torque performance for electric vehicles that use induction electric motors or permanent magnet electric motors. For example, a vehicle stability control system can determine, for induction electric motors, determine a slip frequency based on a stator voltage command vector, stator current vector, and a measured mechanical angle position. For permanent magnet electric motors, the vehicle stability control system can determine a stator flux angle in a rotor reference frame. The vehicle stability control system can determine to adjust a q-axis current level being provided to the electric motor based on the slip frequency or the stator flux angle so as to reduce instability. By using the slip frequency or stator flux angle to adjust the q-axis current, the system can improve peak torque performance of the electric motor by not unnecessarily reducing the q-axis current, while also preventing, reducing or mitigating instability.

Compared to the RFO-based control methods, this technical solution can be less parameter sensitive, particularly at high speeds, and has better torque accuracy in flux weakening region. Compared to SFO-based control methods, this technical solution includes slip frequency estimation and a slip frequency limiter, which allows the controller to be more robust to instability at pull-out torque condition. This allows the controller of this technical solution to operate at the pull-out torque with minimal tuning effort and without obtaining a precise online estimation of motor parameters.

FIG. 1 depicts a block diagram depicting an example system to maintain torque for electric vehicles. The system 100 can include at least one vehicle stability control system 102 for maintaining torque in an electric vehicle. The vehicle stability control system 102 can be referred to as or include a data processing system or computing device. The VSCS 102 can include at least one interface 104, controller component 106, current regulator 108, slip estimator 110, flux observer 112, limiter 114, PI controller 116, or data repository 118. The VSCS 102 can include hardware or a combination of hardware and software, such as communications buses, circuitry, processors, communications interfaces, among others. The VSCS 102 can reside on or within a corresponding vehicle 124 (e.g., a host vehicle).

The data repository 118 can store, manage or reference information to facilitate vehicle maintaining torque or providing vehicle stability control, including, for example, slip thresholds 120, or stator flux angle threshold 122. The data repository 118 can include one or more data structure, databases or data files to store the information. The slip threshold 120 can refer to a maximum tolerable slip frequency that the VSCS 102 can use to adjust a q-axis current. The stator flux angle threshold 122 can refer to a maximum tolerable stator flux angle that the VSCS 102 can use to adjust a q-axis current.

Each of the components of the VSCS 102 can be implemented using hardware or a combination of software and hardware. Each component of the VSCS 102 can include logical circuity (e.g., a central processing unit or CPU) that responses to and processes instructions fetched from a memory unit (e.g., memory 715 or storage device 725). Each component of the VSCS 102 can include or use a microprocessor or a multi-core processor. A multi-core processor can include two or more processing units on a single computing component. Each component of the VSCS 102 can be based on any of these processors, or any other processor capable of operating as described herein. Each processor can utilize instruction level parallelism, thread level parallelism, different levels of cache, etc. For example, the VSCS 102 can include at least one logic device such as a computing device or server having at least one processor to communicate via a network.

The components and elements of the VSCS 102 can be separate components, a single component, or part of the VSCS 102. For example, the interface 104, controller component 106, or slip estimator 110 (and the other elements of the VSCS 102) can include combinations of hardware and software, such as one or more processors configured to initiate stop commands, initiate motion commands, and transmit or receive timing data, for example.

One or more component of the VSCS 102 can be hosted on or within a vehicle 124. One or more components of the VSCS 102 can reside outside or remote from the vehicle 124, and be in communication with the vehicle for at least a certain time period. For example, portions of data illustrated on the data repository 118 can reside on a remote server, such as in a cloud of servers, that maintains the thresholds 120 or 122, and can be accessed by the VSCS 102 (e.g., through a network) at various times (e.g., every 12 hours or 24 hours during an update process). The components of the VSCS 102 can be connected or communicatively coupled to one another. The connection between the various components of the VSCS 102 can be wired or wireless, or any combination thereof. Counterpart systems or components can be hosted on other vehicles to enable communication or coordination between vehicles.

The vehicle 124 can communicate using a network, which can include computer networks such as the internet, local, wide, near field communication, metro or other area networks, as well as satellite networks or other computer networks such as voice or data mobile phone communications networks, and combinations thereof. The network can include or constitute an inter-vehicle communications network, e.g., a subset of components including the VSCS 102 and components thereof for inter-vehicle data transfer. The network can include a point-to-point network, broadcast network, telecommunications network, asynchronous transfer mode network, synchronous optical network, or a synchronous digital hierarchy network, for example. The network can include at least one wireless link such as an infrared channel or satellite band. The topology of the network can include a bus, star, or ring network topology. The network can include mobile telephone or data networks using any protocol or protocols to communicate among vehicles or other devices, including advanced mobile protocols, time or code division multiple access protocols, global system for mobile communication protocols, general packet radio services protocols, or universal mobile telecommunication system protocols, and the same types of data can be transmitted via different protocols.

The system 100 can include or interface with one or more vehicles 124. The vehicle 124 can refer to any type of vehicle or automobile such as cars, trucks, vans, sports utility vehicles, motorcycles, self-driving vehicle, or driver assist vehicle. The vehicle 124 can include an onboard computing unit. The onboard computing unit can include one or more of hardware, software or firmware. The onboard computing unit can include digital components or circuitry, including, for example, one or more component depicted in FIG. 7.

The onboard computing unit can include or interface with, for example, an electronic control unit ("ECU") of the vehicle 124 to provide drive-by-wire functionality. The onboard computing unit can include or be referred to as an automotive computer, and can include a processor or microcontroller, memory, embedded software, inputs/outputs and communication link(s). An ECU involves hardware and software to perform the functions expected from that particular module. For example, types of ECU include Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module. Other examples include domain control unit (DCU), Electric Power Steering Control Unit (PSCU), Human-machine interface (HMI), Telematic control unit (TCU), Speed control unit (SCU), Battery management system (BMS). For example, the onboard computing unit of the vehicle 124 can query one or more component or module of vehicle 124 to determine a status of the vehicle 124, which can include, for example, a location or GPS position of the vehicle, speed of the vehicle, acceleration of the vehicle, turn angle of the vehicle, orientation of the vehicle, throttle of the vehicle, brake status or brake amount, or other information.

The vehicle 124 can include or interface with one or more sensors. The sensors can be coupled to or associated with a vehicle 124. The sensors can provide information to the VSCS 102. The sensors can be part of the vehicle 124, or remote from the vehicle 124. Sensors can include, for example, a radar sensor, lidar sensor, or camera. Sensors of the vehicle 124 can include accelerometers, gyroscopes, weight sensors, or proximity sensors, that can collect, detect or determine vehicle dynamics information such as orientation data, velocity, or weight.

The one or more vehicle 124 can include sensors that are designed, constructed, configured or operational to detect vehicle dynamics information. Sensors can include sensors that detect, for example, an automobile layout, vehicle powertrain information, braking system information, steering information, suspension information, and wheel and tire information. The onboard computing unit or sensors can detect or identify vehicle dynamics information based on aerodynamics information such as drag coefficient, aerodynamics, center of pressure, downforce, ground effect in the vehicle. The onboard computing unit or sensors can detect or identify vehicle dynamics information related to the geometry of the vehicle, such as steering geometry, axle track, camber angle, caster angle, roll center, scrub radius, steering ratio, toe, or wheelbase. The onboard computing unit or sensors can detect or identify vehicle dynamics information related to mass of the vehicle, such as center of mass, moment of inertia, roll moment, sprung mass, unsprung mass, or weight distribution. The onboard computing unit or sensors can detect or identify vehicle dynamics information related to motion of the vehicle, such as body flex, body roll, bump steer, directional stability, critical speed, noise, vibration, harshness, pitch, ride quality, roll, speed wobble, understeer, overstseer, lift-off oversteer, fishtailing, weight transfer, load transfer, yah. The onboard computing unit or sensors can detect or identify vehicle dynamics information related to tire information, such as camber thrust, circle of forces, contact patch, cornering force, ground pressure, pneumatic trail, radial force variation, relaxation length, rolling assistance, self-aligning torque, slip angle, slip, steering ratio, tire load sensitivity. The onboard computing unit or sensors can detect or identify vehicle dynamics information related to the road or surface of the parking zone, such as banked turn, cross slope, drainage gradient, cant, superelevation, road slipperiness, split friction, surface roughness, or texture. The onboard computing unit can retrieve vehicle dynamics information stored in memory of the vehicle 124.

The vehicle 124 can include an electric motor 128. The electric motor 128 can be an induction motor or a permanent magnet motor. The electric motor 128 can refer to an electrical machine that converts electrical energy into mechanical energy. The electric motor 128 can include a stator 130 that is stationary, and a rotor 132 that rotates. The electric vehicle can include a resolver 126 designed constructed or operational to determine, detect, measure or otherwise identify degrees of rotation of the rotor 132 (e.g., relative to the stator 130). The resolver 126 can be analog, digital, or a rotary encoder. The resolver 126 can be a brushless transmitter resolver, receiver resolver, or differential resolver.

Figure 2:
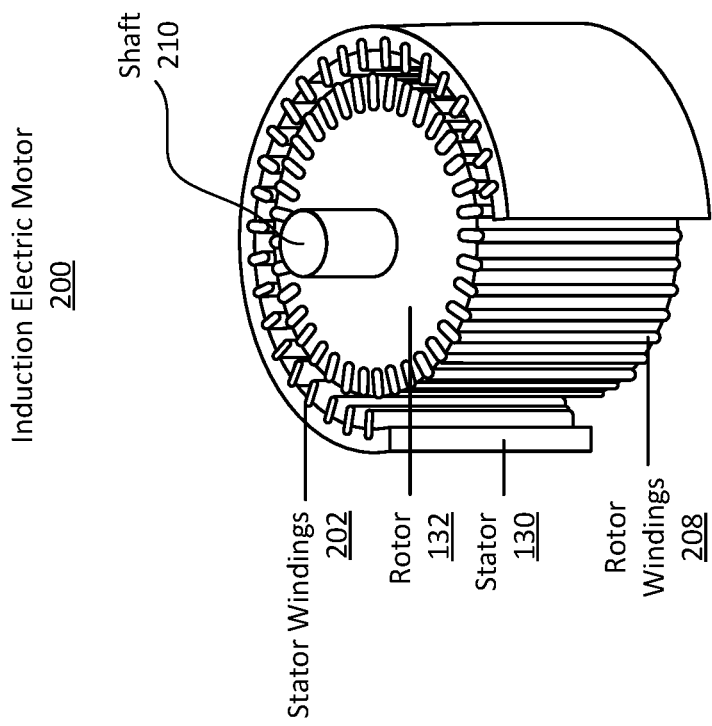
FIG. 2 depicts an example diagram of an induction electric motor, in accordance with an implementation.

FIG. 2 depicts an induction electric motor 200. For example, electric motor 128 depicted in FIG. 1 can include an induction electric motor 200. The electric motor 128 can operate through the interaction between a magnetic field of the electric motor and an electric current in a wire winding to generate force in the form of rotation of a shaft coupled to a rotor 132. The electric motor 128 can be powered by direct current (DC) sources, such as from batteries, motor vehicles or rectifiers, or by alternating current (AC) sources, such as a power grid, inverters or electrical generators.

The induction motor electric motor 200 can include a stator 130 and a rotor 132. The stator 130 can include stator windings 202. The rotor 132 can include rotor windings 208. The rotor 132 can be coupled (e.g., mechanically coupled or fixedly coupled) to a shaft 210. The rotor 132 can rotate and rotate the shaft 210. The shaft 210 can be coupled to wheels of the vehicle 124 to rotate the wheels and move the vehicle 124. The distance between the rotor 132 and stator 130 can be referred to as an air gap. The air gap can impact performance (e.g., a large gap can have a negative effect on performance).

In an induction motor 200, an alternating electric current can turn the rotor 132. The electric motor 128 can product torque in the rotor 132 via the electric current. The electric current can be generated through an electromagnetic induction from a magnetic field of the stator windings 202. Stator windings 202 can refer to a coil that forms an electromagnet. The stator windings 202 can be coper, iron, aluminum or other materials or metals that facilitate generating or forming an electromagnet.

The stator 130 can provide a rotating magnetic field that drives the rotor 132. The speed at which the magnetic field rotates can be referred to as a synchronous speed. The rotor 132 can rotate at a lower speed than the magnetic field of the stator 130. Thus, in an induction electric motor 200, the rotor 132 rotates at a slower rotation speed relative to the magnetic field of the stator 130. The difference in the rotor 132 rotation speed and the speed with which the magnetic field of the stator 130 rotates can be referred to as slip. Sip (or slip frequency) can be measured in radians per second.

The rotor 132 can include rotor windings 208. The rotor 132 can rotate due to the interaction between the rotor windings 208 and the magnetic field produced by the stator windings 202 of the stator 130, which produces a torque around the rotor's 132 axis (e.g., shaft 210). The rotor 132 can be a squirrel-cage rotor, wound rotor, salient pole rotor, cylindrical rotor, or other type of rotor. Rotor windings 208 can be formed of copper, aluminum, iron, or other materials or metals. The rotor 132 can include rotor windings 208 that act as conductors laid into the rotor 132 that carry currents, which interact with the magnetic field of the stator 130 to generate the forces that turn the shaft 210.

The stator 130 core can be made up of many thin metal sheets (e.g., laminations). Laminations can reduce energy losses that may result if a solid core were used. The rotor 132 can refer to the moving part, which turns a shaft to deliver the mechanical power.

Figure 3:
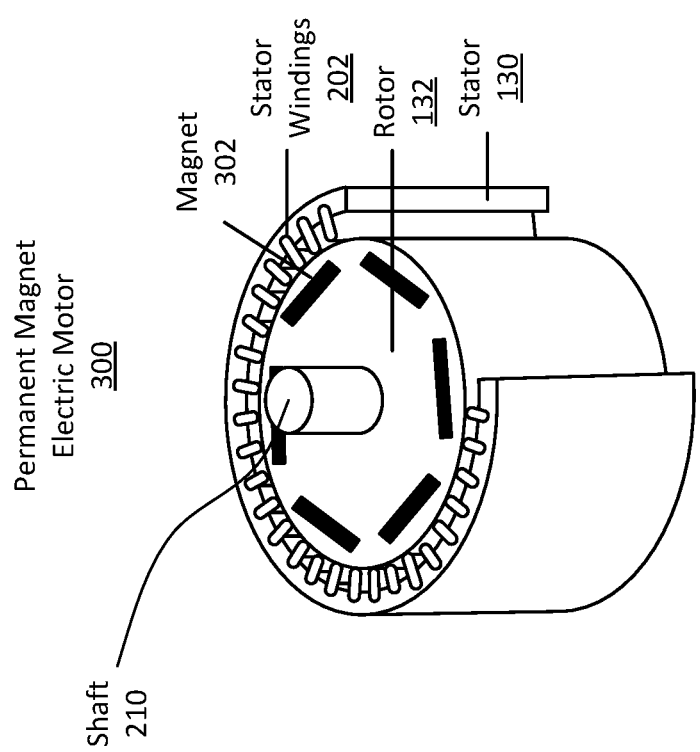
FIG. 3 depicts an example of a permanent magnet electric motor, in accordance with an implementation.

FIG. 3 depicts a surface permanent magnet electric motor 300. The electric motor 128 can include a surface permanent magnet electric motor 300. The permanent magnet electric motor 300 can include a stator 130, rotor 132, shaft 210, and stator windings 202, as depicted for the induction electric motor 200 in FIG. 3. However, the permanent magnet electric motor 300 can include magnets 302 on the rotor 132, instead of rotor windings. The permanent magnet electric motor 300 can use magnets 302 to turn the rotor 132, which can spin at the same speed as the internal rotating magnetic field provided by the stator windings 202. Example permanent magnets can include neodymium, rare earth materials, or other materials. Thus, the rotor 132 can carry permanent magnets 302, and the stator 130 holds the conductors (e.g., stator windings 202). In a permanent magnet electric motor 300, there may be no slip between the magnetic field of the stator 130 and the rotor 132. However, there may be a maximum stator flux angle of pi/2 radians that can cause instability.

Still referring to FIG. 1, and in further detail, the VSCS 102 can include an interface 104. The VSCS 102 can include an interface 102 designed, configured, constructed, or operational to receive and transmit information. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can be designed, constructed or operational to communicate with one or more sensors to collect or receive information. The interface 104 can be designed, constructed or operational to communicate with a controller component 106, current regulator 108, slip estimator 110, limiter 114, resolver 126, or electric motor 128.

The VSCS 102 can include a controller component 106 designed, configured or operational to facilitate dynamic stability control for electric motor drives using stator flux oriented control. The controller component 106 can orchestrate functionality among one or more components of the VSCS 102, or communicate with various components of the electric vehicle, such as the electric motor 128 or resolver 126. The controller component 106 can interface with or otherwise communicate with an on-board computing unit of the electric vehicle, or provide information for display via a display device of the electric vehicle 124. The controller component 106 can command or control one or more components of the system 102. For example, the controller component 106 can control the current regulator 108 by commanding the current regulator 108 to adjust a current output.

The current regulator 108 can include a feed-forward circuitry or may include negative feedback circuitry. The current regulator 108 can be referred to as a voltage regulator or include components or functionality to regulate voltage. The current regulator 108 can include resistors in series with diodes, zener diodes, coiled sensing wire, or include other types of circuitry or processors. The current regulator 108 can include a constant current regulator electronic circuit that delivers or absorbs an electric current which is independent of the voltage across the circuit. The current regulator 108 can be configured to provide a current corresponding to the torque command.

The controller component 106 can determine types of stability control techniques to utilize. The controller component 106 can determine to use a torque control technique for induction motors or permanent magnet motors. The controller component 106 can cause one or more components of the VSCS 102 to being a torque control process.

For example, the VSCS 102 can improve peak torque capability in SFO control by addressing the instability at the pull-out condition. As indicated by Function 1, the torque can increase for a given flux as the slip frequency increases, up to the pull-out torque. The slip frequency at pull-out can be calculated as in Functions (1)-(4).

$$\omega_{so}^2 - \left[\frac{(1-\sigma)\lambda_{ds}^*}{\sigma^2 \tau_r L_s I_{qso}^{es}}\right]\omega_{so} + \left[\frac{1}{\sigma \tau_r}\right]^2 = 0 \quad (1)$$

Function (1) has real solutions when, $$\left[\frac{(1-\sigma)\lambda_{ds}^*}{\sigma^2 \tau_r L_s I_{qso}^{es}}\right]^2 - 4\left[\frac{1}{\sigma \tau_r}\right]^2 \geq 0 \quad (2)$$

At pull-out, $$\left[\frac{(1-\sigma)\lambda_{ds}^*}{\sigma^2 \tau_r L_s I_{qso}^{es}}\right]^2 = \left[\frac{1}{\sigma \tau_r}\right]^2 \quad (3)$$

Therefore, $$\omega_{so} = \left[\frac{1}{\sigma \tau_r}\right] \quad (4)$$

Where:

| | | |
|---|---|---|
| $\omega_{so}$ | steady state slip | [radians/seconds] |
| $I_{qso}^{es}$ | steady state q-axis current in synchronous frame | [Amperes] |
| $\lambda_{ds}^*$ | d-axis flux command | [Weber] |
| $L_m$ | magnetizing inductance | [Henry] |
| $L_s$ | stator inductance | [Henry] |
| $L_r$ | rotor inductance | [Henry] |
| $\sigma = 1 - \frac{L_m^2}{L_s L_r}$ | total leakage factor | |
| $\tau_r = \frac{L_r}{R_r}$ | rotor time constant | [seconds] |

In SFO, if the torque command exceeds the pull-out torque, the q-axis current regulator 108 can continue to increase the slip to increase the torque. However, beyond the pull-out slip, the slip increases without increase in torque. This can lead to a high slip condition (e.g., greater than 4 Hz, 5 Hz, 6 Hz, 8 Hz, 10 Hz, 15 HZ, 20 Hz, or more, depending on the type or size of electric motor). At low flux levels (e.g., driving at highway speed), this can result in large oscillations in current and torque. At high flux level (e.g., fast acceleration from low speed), the current may increase to a very high value resulting in overcurrent faults. An overcurrent fault can cause the electric motor to shut down. For example, the controller component 106 can detect the high current, trigger an overcurrent fault, and disable the electric motor.

The VSCS 102 can prevent instability by using a slip limiter. To do so, the VSCS 102 can determine or estimate the slip. The VSCS 102 can include a slip estimator 110 designed, constructed or operational to estimate slip. The slip estimator 110 can determine, for the electric motor 128 of the electric vehicle 124, a slip frequency indicating a difference between a synchronous speed of a magnetic field of the stator 130 of the electric motor 128 and a rotating speed of a rotor 132 or shaft 210 of the electric motor 128. The slip estimator 110 can determine, measure, estimate or otherwise identify the slip frequency using various techniques. For example, the slip estimator 110 can be obtain data from one or more sensors of the electric motor, such as a resolver 126 (e.g., a rotor speed senor), and a flux observer 112. The slip estimator 110 can The slip estimator 110 can use the stator voltage command vector and stator current vector along with the measured mechanical angle position to estimate the stator flux vector. The slip estimator 110 an then calculate the stator flux vector angle, and the rate of change of the stator flux vector angle or the electrical angular velocity can be estimated using a tracking observer. Determining the slip frequency using this technique may use fewer parameters and is more robust as compared to SFO control based on flux. Thus, the slip estimator 110 of this technical solution can determine the slip frequency based on a difference between an electrical angular velocity (e.g., associated with the magnetic field of the stator 130) and a mechanical angular velocity (e.g., associated with the rotation of the rotor 132 or shaft 210).

Figure 5:
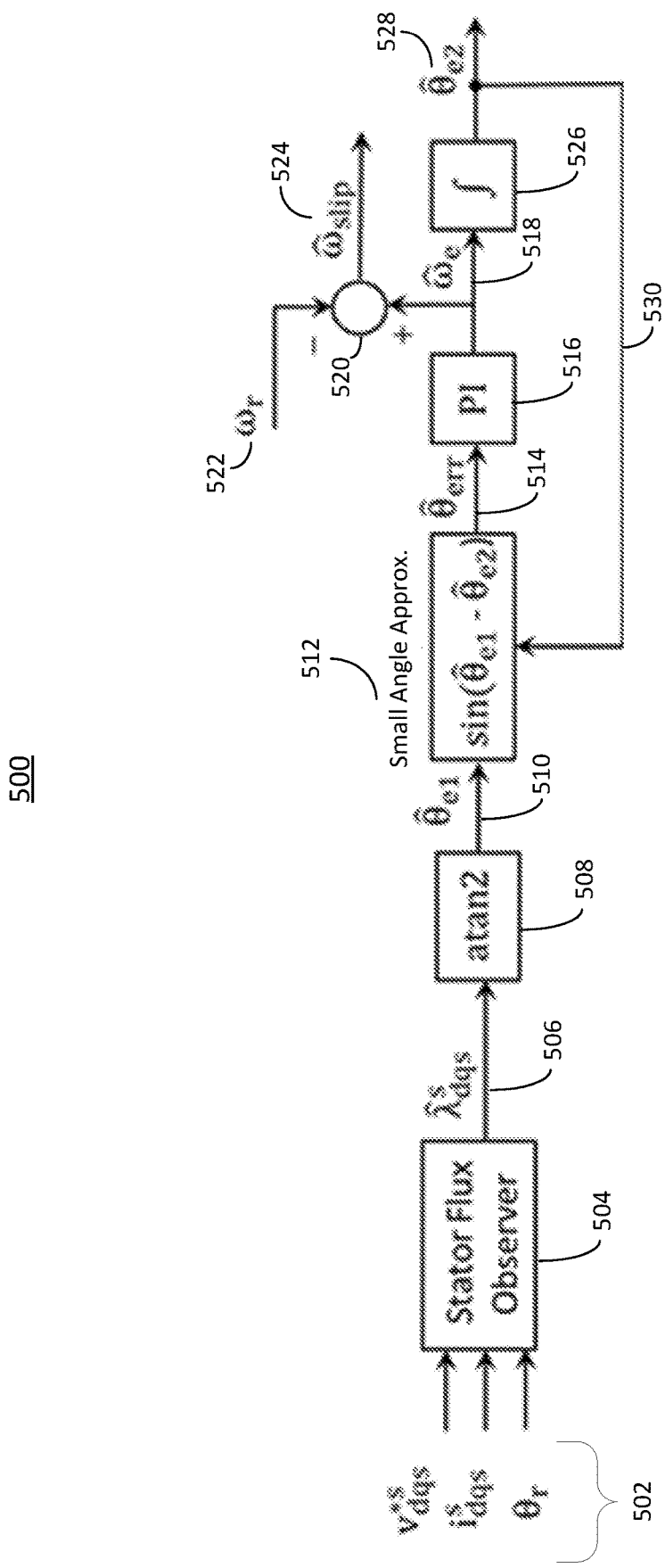
FIG. 5 depicts a block diagram of an example slip estimator for maintaining torque in an electric vehicle, in accordance with an implementation.

The slip estimator 110 can include one or more component or functionality depicted in FIG. 5. FIG. 5 depicts an example operation of a slip estimator 110. Slip estimator 110 can include a stator flux observer (e.g., flux observer 112) and partial integral ("PI") controller 516 (e.g., a PI controller 116). The operation 500 of the slip estimator 110 can include or utilize the following parameters:

| | | |
|---|---|---|
| $v_{dqs}^{*s}$ | stator voltage command vector in stator frame | [V] |
| $i_{dqs}^{s}$ | stator current vector in stator frame | [A] |
| $\hat{\lambda}_{dqs}^{s}$ | estimated stator flux vector in stator frame | [Wb] |
| $\theta_r$ | measured mechanical angle position | [rad] |
| $\omega_r$ | measured mechanical angular velocity | [rad/s] |
| $\hat{\theta}_{e1} = \mathrm{atan2}(\hat{\lambda}_{ds}^s, \hat{\lambda}_{qs}^s)$ | calculated electrical angle position using arctan method | [rad] |
| $\hat{\theta}_{e2}$ | estimated electrical angle position from state estimator | [rad] |
| $\hat{\omega}_e$ | estimated electrical angular velocity | [rad/s] |
| $\hat{\theta}_{err} \approx \sin(\hat{\theta}_{e1} - \hat{\theta}_{e2})$ | calculated position error using small angle approximation | [rad] |
| $\hat{\omega}_{slip}$ | estimated slip frequency | [rad/s] |

At 502, the stator flux observer can receive input from one or more sensors of the electric vehicle 124. The input can include, for example, a stator voltage command vector $v^*_{dqs}{}^s$ in a stator frame having units of Volts. The stator voltage can be applied to the stator windings 202 of the stator 130 of the electric motor 128. The input can include a stator current vector $i_{dqs}{}^s$ in a stator frame having unites of Amperes. The stator current can be applied to the stator windings 202 of the stator 130. The input can include a measured mechanical angle position $\theta_r$ in radians. The mechanical angle position can refer to an angle between a rotor shaft 210 and a stator 130. The slip estimator 110, flux observer 504 or other sensor can include an angle encoder configured to determine the mechanical angle position.

At 506, the stator flux observer 504 can provide an estimated stator flux vector $\hat{\lambda}_{sdq}{}^s$ in a stator frame in units of Webers. The stator flux observer 504 can determine the stator flux vector based on the inputs that include, for example, the stator voltage command vector, stator current vector, and the mechanical angle position. At 508, the slip estimator 110 can determine an a tan 2 (e.g., a 2-argument arctangent) of the estimated stator flux vector. The a tan 2 function can take as input the stator flux vector and convert the stator flux vector from Cartesian coordinates to polar coordinates and output an electrical angle position in radians as follows $\hat{\theta}_{e1} = \mathrm{a\,tan\,2}(\hat{\lambda}_{ds}{}^s, \hat{\lambda}_{qs}{}^s)$.

At 510, the slip estimator 110 can provide the electrical angle position to a small angle approximator 512. The small angle approximator 512 can take as input the electrical angle position, and output a calculated position error using small angle approximation in radians as follows: $\hat{\theta}_{err} \approx \sin(\hat{\theta}_{e1} - \hat{\theta}_{e2})$. The small angle approximator 512 can determine the difference between the electrical angle position and an estimated electrical angle position from a state estimator to output the position error at 514.

The slip estimator 110 can include a PI controller 516 that receives the position error from 514. A PI controller 516 can include a proportional-integral controller. The PI controller 516 can determine a difference between a desired setpoint and a measured process variable and apply a correction based on proportional and integral terms, thereby automatically applying an accurate and responsive correction to a control function, as illustrated in the loop 530. For example, the PI controller 516 can include determining an position error, determining an estimated electrical angle position 528 from the state estimator 526, and feeding the estimated electrical angle position from the state estimator back to the small angle approximator 512 via loop 530 in order to output an estimated electrical angular velocity $\hat{\omega}_e$ at 518. The estimated electrical angular velocity can refer to the electrical angular velocity of the stator magnetic field.

The estimated electrical angular velocity can be combined with the measured mechanical angular velocity $\omega_r$ at 520. The slip estimator 110 can receive the mechanical angular velocity at 522 from a sensor of the electric motor, such as a resolver. The mechanical angular velocity can refer to the rotational rate of the rotor or shaft. The electrical angular velocity of the stator can be greater than the mechanical angular velocity. The slip estimator 110 can subtract the mechanical angular velocity from the electrical angular velocity at 520 to determine the slip frequency $\hat{\omega}_{slip}$ at 524 in radians per second. Thus, the slip estimator 110 can identify a stator voltage command vector, a stator current vector, and a mechanical angle position. The slip estimator 110 can determine a stator flux vector based on the stator voltage command vector, the stator current vector, and the mechanical angle position. The slip estimator 110 can determine an electrical angular velocity based on the stator flux vector. The slip estimator 110 can determine a mechanical angular velocity. The slip estimator 110 can determine the slip frequency based on a difference between the electrical angular velocity and the mechanical angular velocity.

The VSCS 102 can use the slip frequency to maintain torque in the electric vehicle. The controller component 106 can obtain the slip frequency and compare the slip frequency with a threshold. The controller component 106 can obtain a slip threshold 120 from the data repository 118. The slip threshold 120 can be a slip frequency, such as 4 Hz, 5 Hz, 6 Hz, 7 Hz, 10 Hz, 12 Hz, 15 Hz, or more. The slip threshold 120 can vary based on the type of electric motor or size of the electric motor. The slip threshold 120 can be a predetermined value or default value that is preconfigured for the electric vehicle 124. The controller component 106 can compare the slip frequency with the threshold. If the slip frequency is greater than or equal to the threshold, the controller component 106 can determine to activate a slip limiter (e.g., limiter 114) to adjust a current command to generate an adjusted current command that causes a reduction in the slip frequency.

Figure 6:
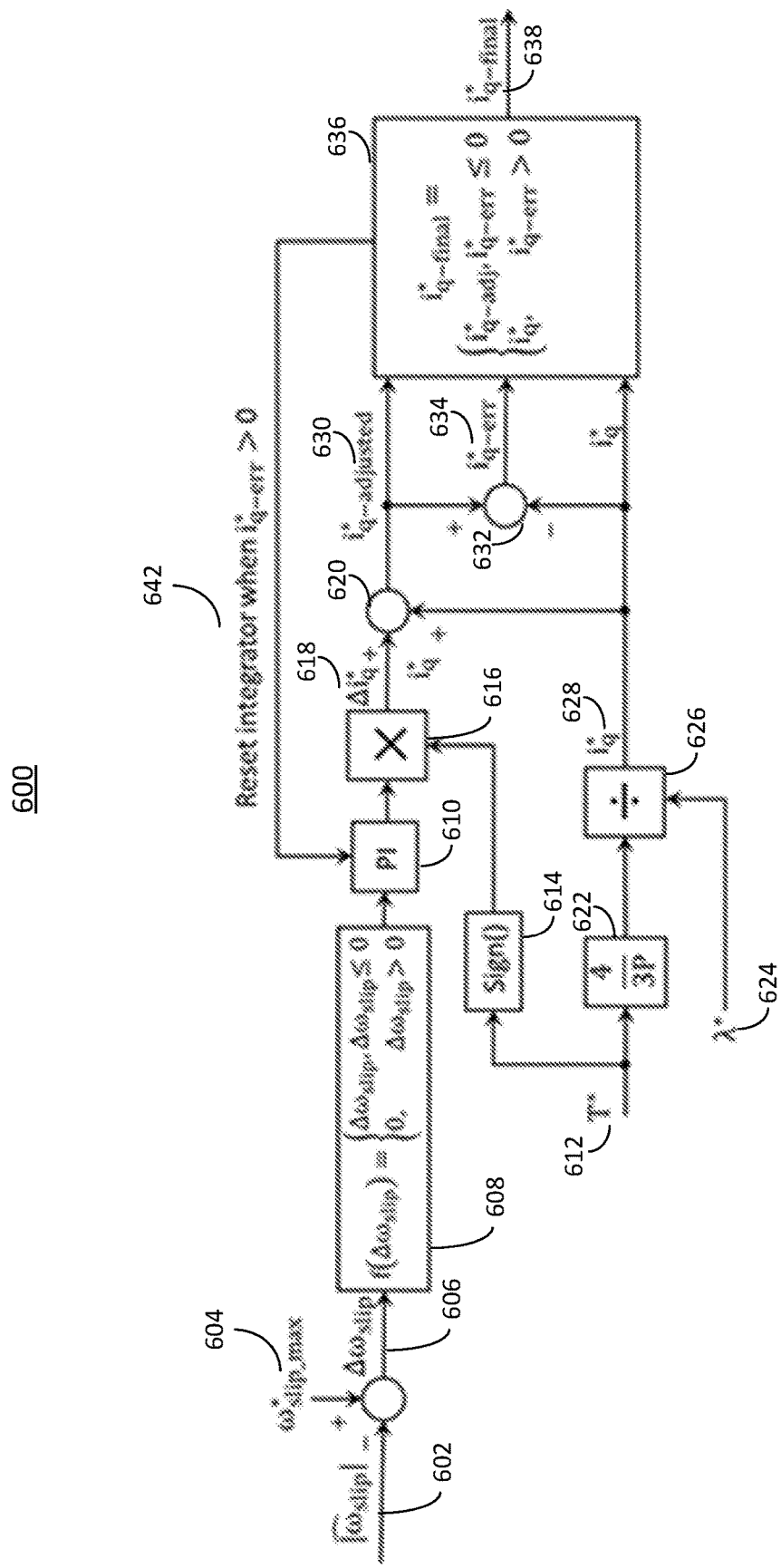
FIG. 6 depicts a block diagram of an example slip-limiter for maintaining torque in an electric vehicle, in accordance with an implementation.

If the slip frequency exceeds a preset maximum slip frequency ($\omega^*_{slip\text{-}max}$), the controller component 106 can trigger the slip-limiter (e.g., limiter 114) shown in FIG. 6, and the PI controller can reduce the q-axis current command till the slip frequency is limited, and thus prevents instability. The slip limiter (e.g., limiter 114) can remain activated until the external torque command (T*) reduces and becomes smaller than the slip-limited iq command ($i^*_{q\text{-}adjusted}$). The maximum slip frequency (e.g., slip threshold 120) can be set to a value around 1.2× the maximum expected slip frequency allowing room for error. If the max slip frequency is higher than the $\omega^*_{slip\text{-}max}$, the maximum torque capability of the electric motor 128 can be achieved, and even if an infeasible torque is commanded, the VSCS 102 can maintain stable operation without precise knowledge of parameters and is robust to parameter variations.

The VSCS 102 can include a limiter 114. The limiter 114 can refer to a slip limiter for induction motors. The limiter 114 can be designed, constructed, or operational to limit slip frequency so as to improve peak torque performance while preventing or mitigating instability. The limiter 114 can include one or more components or functionality depicted in FIG. 6. For example, the limiter 114 can perform the process or operation 600 depicted in FIG. 6, where:

| | | |
|---|---|---|
| $\|\hat{\omega}_{slip}\|$ | absolute value of the estimated slip | [rad/s] |
| $\omega_{slip\text{-}max}^*$ | feasible slip command | [rad/s] |
| $\Delta\omega_{slip}$ | slip error between the slip command and absolute slip | [rad/s] |
| $\Delta i_q^*$ | compensation q-axis current command from the PI controller | [A] |
| T* | torque command | [Nm] |
| λ* | optimal flux command | [Wb] |
| P | number of poles for the machine | |
| $i_q^*$ | original q-axis current command without slip control | [A] |
| $i_{q\text{-}adjusted}^*$ | adjusted q-axis current command with slip control | [A] |
| $i_{q\text{-}err}^*$ | difference between the adjusted and original q-axis current command | [A] |
| $i_{q\text{-}final}^*$ | final q-axis current command that goes into the current controller | [A] |

At 602, the limiter 114 can receive the absolute value of the slip $|\hat{\omega}_{slip}|$ determined by the slip estimator 110 at 524 in operation 500. At 604, the limiter 114 can obtain the maximum feasible slip command $\omega^*_{slip\text{-}max}$, which can correspond to a slip threshold 120. At 606, the limiter 114 can determine the difference between the slip frequency and the slip threshold or maximum feasible slip command as $\Delta\omega_{slip}$, which can represent the slip error between the slip command and an absolute slip or slip threshold. The limiter 114 can determine the slip error by subtracting the absolute value of the slip frequency estimate from the slip threshold.

If the slip error is less than or equal to zero, which indicates that the estimated slip frequency is greater than the slip threshold, then function 608 can output the slip error to a PI controller 610. If the slip is greater than zero, which indicates that the slip frequency is less than the slip threshold, then the function 608 can output a value of zero. Thus, if the slip frequency is less than the threshold, then the limiter 114 can determine not to adjust the q-axis current to control the current. However, if the limiter 114 determines that the slip frequency is greater than the threshold at function 608, then the limiter 114 can determine to adjust the q-axis current.

At 612, the limiter 114 receives a torque command. At 622, the limiter 114 determines the ratio of 4 divided by the product of 3 and the number of poles for the electric motor. At 626, the limiter 114 divides the ratio by the optimal flux command λ* received at 624 to generate an original q-axis current command without slip control $i^*_q$ as output 628. This q-axis current command refers to the amount of current needed to generate torque pursuant to the torque command received at 612. The torque command can correspond to pushing on the accelerator in the electric vehicle 124 to drive or move the electric vehicle 124. The limiter 114 can provide the torque command received at 612 to a sign function at 614, and the output is combined with the output of the PI controller 610 at 616 to provide a compensation q-axis current $\Delta i^*_q$ at 618.

The PI controller 610 can receive feedback 642 that includes the final q-axis current. At 620, the limiter 114 can combine the compensation q-axis current with the original q-axis current to generate an adjusted q-axis current 630. The limiter 114 can subtract the original q-axis current from the adjusted q-axis current at 632 to generate a difference between the adjusted and original q-axis current command $i^*_{q\text{-}err}$. With function 636, the limiter 114 can output the final q-axis current command to send to the controller component 106. If the difference between the adjusted and original q-axis current command is less than or equal to zero, then the final q-axis current command is the slip adjusted q-axis current command $i^*_{q\text{-}adjusted}$. For example, if the slip adjusted current is less than the original q-axis current determined based on the desired torque command, then the limiter 114 determines to limit the current so as to prevent instability in the electric motor by using the slip adjusted current command. However, if the difference between the adjusted and original q-axis current command is greater than zero, which indicates that the torque command received at 612 would not lead to a current that would result in instability by increasing slip frequency, then the limiter 114 can determine to use the original q-axis as determined at 628. If the difference is greater than zero, the limiter 114 can also reset the PI controller 610 at 642.

Thus, the VSCS 102 can activate the limiter 114 responsive to the slip frequency being greater than the threshold, and then output a slip control adjusted q-axis current command if the adjusted current command is less than the original q-axis current command based on the desired torque command. However, if the slip adjusted current command is greater than the q-axis current command based on the desired torque command, then the VSCS 102 can deactivate the limiter 114 and use the original q-axis current as the final current command. Deactivating the limiter 114 can refer to the VSCS 102 providing the original q-axis current determined based on the input torque command to drive the electric motor 128 (e.g., to the stator windings 202 of the stator 130). Deactivating the limiter 114 can refer to selecting $i^*_q$ at ACT 636 to use as $i^*_{q\text{-}final}$. In some cases, the limiter 114 can continue to operate, however the q-axis current command can be selected in accordance with ACT 636 depicted in FIG. 6. By deactivating the limiter 114 (e.g., not using the adjusted q-axis current), the VSCS 102 can maintain peak torque performance while preventing or mitigating instability because the VSCS 102 can determine that the q-axis current based on the torque command may not cause instability and is, therefore, suitable to drive the electric motor 128.

The VSCS 102 can determine a slip error 606 between a maximum feasible slip command and the slip frequency determined for the electric motor, and generate the adjusted current command $i^*_{q\text{-}adjusted}$ based on the slip error.

The limiter 114 can determine a difference between the slip frequency and the threshold at 606. The limiter 114 can input the difference into a proportional-integral controller at 610 to output a compensation q-axis current command at

630. The limiter 114 can receive a torque command at 612. The limiter 114 can determine the current command based on the torque command at 628. The limiter 114 can determine the adjusted current command based on the compensation q-axis current command and the current command at 638 (e.g., based on the difference at 634).

The limiter 114 can receive a torque command responsive to an indication to accelerate movement of the electric vehicle 124 (e.g., pushing on the pedal or accelerator in the electric vehicle 124, or a self-driving mechanism increasing acceleration). The limiter 114 can determine the current command based on the torque command at 628. The limiter 114 can adjust the current command to generate the adjusted current command 630 responsive to receipt of the torque command to accelerate movement of the electric vehicle. The adjusted current command 630 can cause acceleration of the movement of the electric vehicle that is different from the current command 628 based on the torque command received at 612 responsive to the indication to accelerate movement of the electric vehicle 124.

Thus, the VSCS 102 can detect the slip frequency greater than the threshold responsive to a q-axis current regulator increasing the current command to cause an increase in the slip frequency responsive to a torque command exceeding a pull-out torque (e.g., a maximum torque). The VSCS 102 can then activate, responsive to the slip frequency greater than the threshold, the slip limiter 114 to manage oscillations in a q-axis current, manage oscillations in torque, or prevent an overcurrent fault by outputting an adjusted q-axis current.

For example, permanent magnet motors (as depicted in FIG. 3) can be synchronous machines which operate at zero slip. In these machines, the stator flux angle in the rotor reference frame can be a variable analogous to slip frequency in asynchronous machines (e.g., FIG. 2). The limiter 114 can limit stator flux angle. The pull-out stator flux angle $\theta_\lambda$ is $$\frac{\pi}{2}$$

as shown in functions (5)-(8).

$$T = \frac{3}{2}\frac{P}{2}\lambda_{pm}I_q = \frac{3}{2}\frac{P}{2}\lambda_{pm}\left(\frac{l_s \sin(ql)}{L_s}\right) \quad (5)$$

Where,

| T | airgap torque | [Nm] |
| P | number of poles for the machine | |
| $\lambda_{pm}$ | permanent flux linkage | [Wb] |
| $I_q$ | q-axis current | [A] |
| $\lambda_s$ | magnitude of the stator flux | [Wb] |
| $\theta_\lambda$ | angle between the stator flux vector and stator current vector | [rad] |
| $L_s$ | stator inductance | [H] |

Therefore, for the maximum torque per flux condition (e.g., at pull-out torque), $$\frac{dT}{dql} = 0 \quad (6)$$

$$\frac{3}{2}\frac{P}{2}\lambda_{pm}\frac{l_s\cos(ql)}{L_s} = 0, \quad (7)$$

$$\cos(\square\square) = 0 \quad (8)$$

Therefore, the pull-out stator flux angle $\theta_\lambda$ in SPMs is $$\frac{\pi}{2}.$$

Thus, the VSCS 102 can use SFO control to limit a stator flux angle to prevent instability to improve the peak torque capability without the need of precise parameter estimates. If the stator flux angle is greater than a stator flux angle threshold, then the limiter 114 can activate, responsive to the stator flux angle greater than or equal to the threshold, a stator flux angle limiter to adjust a current command to cause a reduction in the stator flux angle.

For permanent magnet motors, the controller component 106 can determine the stator flux angle in the rotor reference frame. The controller component 106 can determine the stator flux angle based on the stator flux vector determined by the stator flux observer 504. The VSCS 102 (e.g., via flux observer 112 or components of the slip estimator 110) can identify a stator voltage command vector, a stator current vector, and a mechanical angle position. The VSCS 102 can determine a stator flux vector based on the stator voltage command vector, the stator current vector, and the mechanical angle position. The VSCS 102 can determine the stator flux angle as an angle between the stator flux vector and the stator current vector.

The controller component 106 can compare the stator flux with a stator flux angle threshold, and activate a limiter 114 responsive to the stator flux angle being greater than or equal to the threshold, which can correspond to the pull-out stator flux angle $$\theta_\lambda = \frac{\pi}{2}.$$

The VSCS 102 can include a limiter 114. The limiter 114 can refer to a stator flux angle limiter for permanent magnet electric motors. The limiter 114 can be designed, constructed, or operational to limit stator flux angle so as to improve peak torque performance while preventing or mitigating instability. The limiter 114 can use one or more component or functionality depicted in FIG. 6 to adjust the q-axis current to reduce the stator flux angle. For example, the stator flux angle can be received at 602 instead of the slip frequency estimate. At 606, the stator flux angle can be compared with the stator flux angle threshold instead of the maximum feasible slip frequency 604. The output at 606 can represent a difference between the stator flux angle and the pull-out stator flux angle of pi/2. Thereafter, the limiter can proceed to determine an adjusted q-axis current command, compare the adjusted q-axis current command with an original q-axis current command corresponding to the desired torque command 612, and then provide a final q-axis current command based on whether the adjusted current command is greater than or less than the original q-axis current command. Thus, the limiter 114 can be configured to use stator flux angle for permanent magnet motors, and slip frequency for induction motors by adjusting the inputs at 602 and 604, the output at 606, and the function 608 by replacing slip frequency with stator flux angle, and replacing the slip threshold with the stator flux angle threshold of pi/2.

Figure 4:
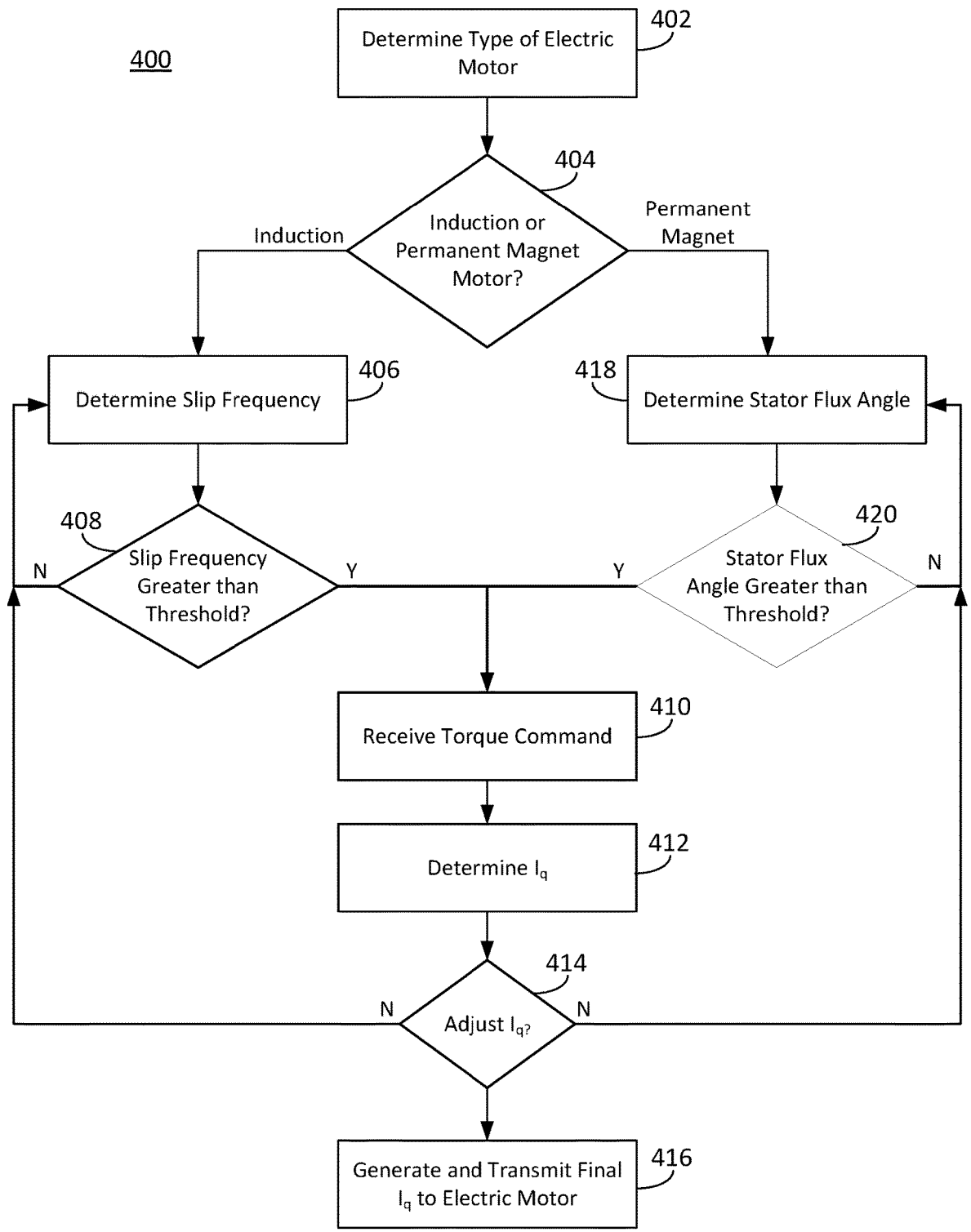
FIG. 4 depicts a flow diagram depicting an example method of maintaining torque in an electric vehicle, in accordance with an implementation.

FIG. 4 depicts a flow diagram depicting an example method of maintaining torque, in accordance with an implementation. The method 400 can be performed by one or more system, component or function depicted in FIG. 1, 2, 3, 5, 6 or 7, including, for example, by a data processing system, vehicle stability control system ("VSCS"), limiter, slip estimator, or controller component. At ACT 402, the VSCS can determine the type of electric motor. Types of electric motors of electric vehicles can include induction motors or surface permanent magnet motors. The VSCS can determine the type of motor based on a setting or configuration associated with the electric vehicle. In some cases, the VSCS can be preconfigured with the type of motor and skip ACT 402 or ACT 404 and proceed directly to the ACT corresponding to the type of motor.

At decision block 404, if the VSCS determines the type of motor is an induction motor, the VSCS proceeds to ACT 406 to determine the slip frequency. The VSCS can determine the slip frequency based on a difference between an electric angular velocity and mechanical angular velocity. For example, the VSCS can use a slip estimator operation depicted in FIG. 5 to determine the slip frequency.

At decision block 408, the VSCS can determine if the slip frequency is greater than a slip threshold (e.g., a maximum feasible slip frequency). If the slip frequency is not greater than the slip threshold, the VSCS can return back to ACT 406 and determine the slip frequency for a next time interval or time period or instance.

If, at decision block 404, the VSCS determine the electric motor type is permanent magnet motor, the VSCS can proceed to ACT 418 and determine a stator flux angle. At decision block 420, the VSCS can determine if the stator flux angle is greater than a stator flux angle threshold, such as a pi/2. If the stator flux angle is not greater than the threshold, the VSCS can return back to ACT 418 to continue determining the stator flux angle for a next time interval, time period, or moment.

If or when, at decision block 408, the VSCS determines the slip frequency is greater than the slip threshold, the VSCS can proceed to ACT 410. Similarly, for a permanent magnet motor, the VSCS can proceed from decision block 420 to ACT 410 if the stator flux angle is greater than the stator flux angle threshold.

At ACT 410, the VSCS can receive at torque command. The torque command can correspond to accelerating the electric vehicle. The torque command can correspond to a current. At ACT 412, the VSCS can determine a q-axis current command based on the torque command. For example, the VSCS can determine the q-axis current command for the torque command based on the operation 600 depicted in FIG. 600.

At ACT 414, the VSCS can determine whether to adjust the original q-axis current determined based on the input torque command received at ACT 410. The VSCS can determine whether to adjust the q-axis current command based on the operation depicted in FIG. 600, such as whether the $i^*_{q\text{-}err}$ is less than zero. If the VSCS determines not to use the adjusted q-axis current control, the VSCS can return back to determine either the slip frequency at 406 if induction electric motor, or determine stator flux angle at 418 if surface permanent magnet motor.

If the VSCS determines to use an adjusted q-axis current control based at decision block 414 (e.g., via operation 600), the VSCS can proceed to ACT 416 to generate and transmit a final q-axis current command to the electric motor.

Figure 7:
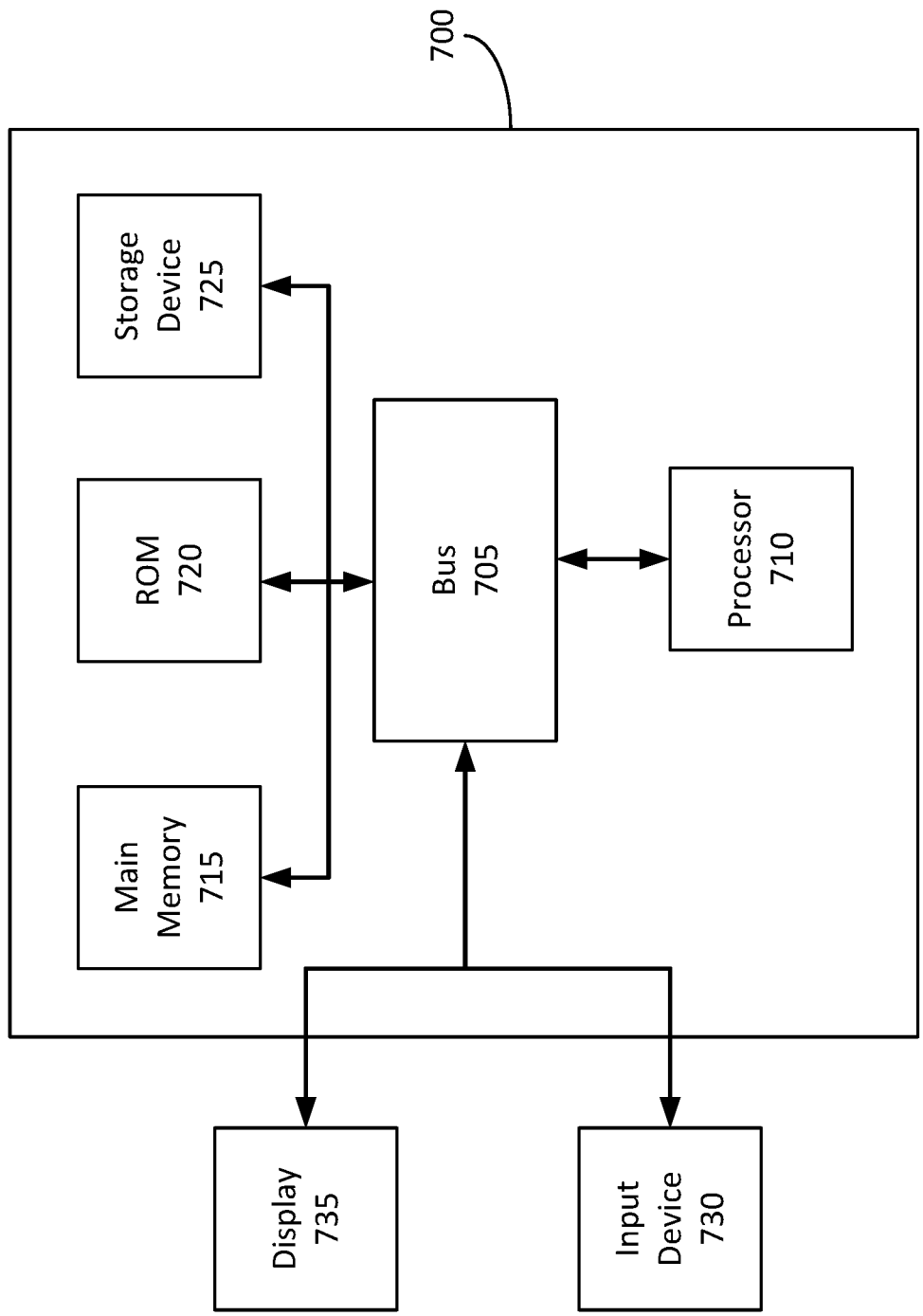
FIG. 7 is a block diagram illustrating an architecture for a computer system that can be employed to implement elements of the systems and methods described and illustrated herein, including, for example, the systems depicted in FIG. 1, operations or examples depicted in FIGS. 5 and 6, and the method depicted in FIG. 4.

FIG. 7 is a block diagram of an example computer system 700. The computer system or computing device 700 can include or be used to implement the VSCS 102, or its components such as the VSCS 102. The computing system 700 includes at least one bus 705 or other communication component for communicating information and at least one processor 710 or processing circuit coupled to the bus 705 for processing information. The computing system 700 can also include one or more processors 710 or processing circuits coupled to the bus for processing information. The computing system 700 also includes at least one main memory 715, such as a random access memory (RAM) or other dynamic storage device, coupled to the bus 705 for storing information, and instructions to be executed by the processor 710. The main memory 715 can be or include the memory. The main memory 715 can also be used for storing vehicle information, command information, thresholds, battery information, or other information during execution of instructions by the processor 710. The computing system 700 may further include at least one read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions. The storage device 725 can include or be part of the memory 112.

The computing system 700 may be coupled via the bus 705 to a display 735, such as a liquid crystal display, or active matrix display, for displaying information to a user such as a driver of the vehicle 124. An input device 730, such as a keyboard or voice interface may be coupled to the bus 705 for communicating information and commands to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735. The display 735 (e.g., on a vehicle dashboard) can be part of the VSCS 102, or other component of FIG. 1, as well as part of the vehicle external to the VSCS 102, for example.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., slip estimator 110 and limiter 114) and operation 500 or 600 depicts grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system to maintain torque in an electric vehicle, comprising:
    a vehicle stability control system comprising one or more processors to:
    determine, for an electric motor of the electric vehicle, a slip frequency indicating a difference between a synchronous speed of a magnetic field of the electric motor and a rotating speed of a rotor of the electric motor;
    compare the slip frequency with a threshold;
    activate, responsive to the slip frequency greater than or equal to the threshold, a slip limiter to adjust a current command to generate an adjusted current command that causes a reduction in the slip frequency; and
    deactivate, responsive to an external torque command less than a subsequent current command received subsequent to transmission of the adjusted current command, the slip limiter, wherein the external torque command corresponds to an indication to accelerate movement of the electric vehicle, and the electric motor comprises an induction motor.

2. The system of claim 1, comprising the vehicle stability control system to:
    determine an electrical angular velocity;
    determine a mechanical angular velocity; and
    determine the slip frequency based on a difference between the electrical angular velocity and the mechanical angular velocity.

3. The system of claim 1, comprising the vehicle stability control system to:
    identify a stator voltage command vector, a stator current vector, and a mechanical angle position;
    determine a stator flux vector based on the stator voltage command vector, the stator current vector, and the mechanical angle position;
    determine an electrical angular velocity based on the stator flux vector;
    determine a mechanical angular velocity; and
    determine the slip frequency based on a difference between the electrical angular velocity and the mechanical angular velocity.

4. The system of claim 1, comprising the vehicle stability control system to:
    determine a slip error between the threshold and the slip frequency determined for the electric motor; and generate the adjusted current command based on the slip error.

5. The system of claim 1, comprising the vehicle stability control system to:
   determine a difference between the slip frequency and the threshold;
   input the difference into a proportional-integral controller to output a compensation q-axis current command;
   receive a torque command;
   determine the current command based on the torque command; and
   determine the adjusted current command based on the compensation q-axis current command and the current command.

6. The system of claim 1, comprising the vehicle stability control system to:
   receive a torque command responsive to the indication to accelerate movement of the electric vehicle;
   determine the current command based on the torque command; and
   adjust the current command to generate the adjusted current command responsive to receipt of the torque command to accelerate movement of the electric vehicle, wherein the adjusted current command causes acceleration of the movement of the electric vehicle that is different from the current command based on the torque command received responsive to the indication to accelerate movement of the electric vehicle.

7. The system of claim 1, comprising the vehicle stability control system to:
   detect the slip frequency greater than the threshold responsive to a q-axis current regulator increasing the slip frequency responsive to a torque command exceeding a pull-out torque; and
   activate, responsive to the slip frequency greater than the threshold, the slip limiter to manage oscillations in a q-axis current, manage oscillations in torque, or prevent an overcurrent fault.

8. A method of maintaining torque in an electric vehicle, comprising:
   determining, by a vehicle stability control system comprising one or more processors, for an electric motor of the electric vehicle, a slip frequency indicating a difference between a synchronous speed of a magnetic field of the electric motor and a rotating speed of a rotor of the electric motor;
   comparing, by the vehicle stability control system, the slip frequency with a threshold;
   activating, by the vehicle stability control system, responsive to the slip frequency greater than or equal to the threshold, a slip limiter to adjust a current command to generate an adjusted current command that causes a reduction in the slip frequency; and
   deactivating, by the vehicle stability control system, responsive to an external torque command less than a subsequent current command received subsequent to transmission of the adjusted current command, the slip limiter, wherein the external torque command corresponds to pushing an accelerator in the electric vehicle, and the electric motor comprises an induction motor.

9. The method of claim 8, comprising:
   determining an electrical angular velocity;
   determining a mechanical angular velocity; and
   determining the slip frequency based on a difference between the electrical angular velocity and the mechanical angular velocity.

10. The method of claim 8, comprising:
    identifying a stator voltage command vector, a stator current vector, and a mechanical angle position;
    determining a stator flux vector based on the stator voltage command vector, the stator current vector, and the mechanical angle position;
    determining an electrical angular velocity based on the stator flux vector;
    determining a mechanical angular velocity; and
    determining the slip frequency based on a difference between the electrical angular velocity and the mechanical angular velocity.

11. The method of claim 8, comprising:
    determining a slip error between the threshold and the slip frequency determined for the electric motor; and
    generating the adjusted current command based on the slip error.

12. The method of claim 8, comprising:
    determining a difference between the slip frequency and the threshold;
    inputting the difference into a proportional-integral controller to output a compensation q-axis current command;
    receiving a torque command;
    determining the current command based on the torque command; and
    determining the adjusted current command based on the compensation q-axis current command and the current command.

13. The method of claim 8, comprising:
    receiving a torque command responsive to an indication to accelerate movement of the electric vehicle;
    determining the current command based on the torque command; and
    adjusting the current command to generate the adjusted current command responsive to receipt of the torque command to accelerate movement of the electric vehicle, wherein the adjusted current command causes acceleration of the movement of the electric vehicle that is different from the current command based on the torque command received responsive to the indication to accelerate movement of the electric vehicle.

14. The method of claim 8, comprising:
    detecting the slip frequency greater than the threshold responsive to a q-axis current regulator increasing the slip frequency responsive to a torque command exceeding a pull-out torque; and
    activating, responsive to the slip frequency greater than the threshold, the slip limiter to manage oscillations in a q-axis current, manage oscillations in torque, or prevent an overcurrent fault.

15. A system to maintain torque in an electric vehicle, comprising:
    a vehicle stability control system comprising one or more processors to:
    determine, for an electric motor of the electric vehicle, a stator flux angle in a rotor reference frame of the electric motor;
    compare the stator flux angle with a threshold;
    activate, responsive to the stator flux angle greater than or equal to the threshold, a stator flux angle limiter to adjust a current command to cause a reduction in the stator flux angle; and
    deactivate, responsive to an external torque command less than the current command adjusted by the stator flux angle limiter, the stator flux angle limiter, wherein the external torque command corresponds to an indication to accelerate movement of the electric vehicle, and the electric motor comprises a surface permanent magnet motor.

16. The system of claim 15, wherein the threshold corresponds to a pull-out stator flux angle of pi/2.

17. The system of claim 15, comprising the vehicle stability control system to:
- identify a stator voltage command vector, a stator current vector, and a mechanical angle position;
- determine a stator flux vector based on the stator voltage command vector, the stator current vector, and the mechanical angle position; and
- determine the stator flux angle as an angle between the stator flux vector and the stator current vector.

* * * * *